United States Patent Office 3,539,563
Patented Nov. 10, 1970

3,539,563
TETRACYCLINE: 6-AMINO-4-OXO-2-(BETA-CHLO-ROETHYL) - 2,3 - DIHYDROBENZENE - 1,3-OXA-ZINE DOUBLE SALT·DIHYDRATE
Aldo Garzia, Milan, Italy, assignor to Istituto Chemioterapico Italiano S.p.A., Milan, Italy, a corporation
No Drawing. Filed Sept. 27, 1965, Ser. No. 490,634
Int. Cl. C07d 87/06
U.S. Cl. 260—244       1 Claim

ABSTRACT OF THE DISCLOSURE

A therapeutic composition having antibiotic and antiphlogistic properties comprising tetracycline in combination with 6 - amino - 4 - oxo - 2 - ($\beta$-chloroethyl)-2,3-dihydrobenzo-1,3-oxazine.

---

This invention relates to a therapeutic composition having antibiotic and anti-phlogistic properties. In a particular aspect it relates to a combination of 6-amino-4-oxo-2-($\beta$ - chloroethyl) - 2,3 - dihydrobenzo - 1,3 - oxazine, hereafter referred to as A–350, with tetracycline.

Many diseases are characterized by bacterial invasion followed by an inflammatory process. Such diseases can often be successfully treated with antibiotics, but it has long been recognized that the unrelieved inflammatory process (also known as phlogosis) can reduce the therapeutic effectiveness of the antibiotic and retard the healing process; furthermore it adds to the discomfort and malaise of the patient. Many methods of treatment are available to the physician for alleviating the fever and inflammation accompanying disease. However, as is well known to the medical profession, each method of treatment has its own particular disadvantages and shortcomings so it is important that the physician has improved methods of treatment available to him.

It is an object of the present invention to provide a therapeutic composition having antibiotic and antiphlogistic properties.

Another object is to provide a combination of tetracycline and A–350 having both antibiotic and antiphlogistic properties.

Other objects will be apparent to those skilled in the art from this disclosure.

It is the discovery of this invention that the combination of tetracycline and A–350 and pharmaceutically acceptable salts thereof provide a therapeutically effective composition for the treatment of disease caused by bacterial invasion and inflammation when the invading bacteria are susceptible to the antibiotic activity of tetracycline. The therapeutic combination of this invention provides blood levels of tetracycline of longer duration and hence of superior therapeutic effectiveness than is obtained by the equivalent amount of tetracycline. Furthermore, the combination of this invention penetrates the localized area of inflammation after administration more rapidly than does the equivalent amount of tetracycline.

Generally, the tetracycline and A–350 are in the form of the pharmaceutically acceptable salts, tetracycline sulfate and A–350 sulfate.

The term "pharmaceutically accepted salt" is meant to include a salt having a cation not objectionable in the practice of pharmacy, for example the salt of sulfuric acid or hydrochloric acid. An example of a satisfactory combination is a physical mixture of a tetracycline salt, e.g., tetracycline sulfate with an A–350 salt, e.g., A–350 sulfate. Generally the preferred proportion of tetracycline to A–350 will be in a 1:1 molar ratio. However proportions varying from about 0.5 to about 1.5 moles tetracycline per mole of A–350 are satisfactory. The combination of this invention can be provided by preparing the combination by any method known to those skilled in the art.

In a preferred embodiment of this invention, the combination of tetracycline and A–350 is provided by the double salt of tetracycline and A–350 with sulfuric acid, the preparation of which is set forth below. In this preferred combination, the tetracycline, A–350, and sulfuric acid are present in a 1:1:1 molar ratio. This preferred combination has been given the brand name Singletin.

The preferred double salt, antibiotic combination of this invention can be conveniently prepared by suspending tetracycline in 99% ethyl alcohol at ambient temperature and adding a solution of the bisulfate of A–350 in 98% methanol-2% water. The mixture is agitated until the tetracycline is completely dissolved and the ethyl alcohol and methanol are removed under vacuum at 15° C. to near dryness. Ethyl ether is added and the slurry is agitated for a few seconds and is then filtered and dried under vacuum at room temperature. Complete details of the preparation are given in Example 1.

The tetracycline or tetracycline salt employed for the production of the composition of this invention can be obtained commercially. The pharmaceutical grade of tetracycline or a pharmaceutically acceptable salt thereof, e.g., tetracycline sulfate, is preferred because its use eliminates possible purification problems resulting from the presence of impurities. A grade of lesser purity can be used in the preparation of the combination of this invention. When a grade of lesser purity is employed, greater care is taken to purify the end product.

A–350 may be prepared as set forth below. It is preferred that the materials used for the preparation be of good quality to avoid unnecessary contamination. A–350 may be prepared by reducing the 6-nitro derivative of 4-oxo-2-($\beta$-chloroethyl)-2,3-dihydrobenzo-1,3-oxazine. The parent oxazine may be prepared by the method of Ohnacker et al., U.S. Pat. No. 2,943,087 and the 6-nitro derivative may be prepared by direct nitration in accordance with the following procedure.

Preparation of 6-nitro-4-oxo-2-($\beta$-chloroethyl)-2,3-dihydrobenzo-1,3-oxazine A mixture of sulfuric acid, 97 g., and nitric acid (d.=1.5), 43 g., is introduced into a flask which is cooled externally by means of brine. Then, 4-oxo-2-($\beta$-chloroethyl)-2,3-dihydrobenzo-1,3-oxazine, 70.4 g. (0.33 mole), previously prepared in accordance with U.S. Pat. No. 2,943,087, is added so slowly that the temperature is maintained between 0° C. and 5° C.

The reaction is exothermic; therefore, the oxazine to be nitrated is fed at a controlled rate to the nitrating mixture. At temperatures below 0° C., the nitration is incomplete, while at temperatures above 10° C., resinous products are formed.

At the end of the addition, the cooling bath is removed, and the mixture is stirred at room temperature for three hours. The oily mass which results is poured in a fine stream on about 600 g. of crushed ice and allowed to stand overnight. Then, it is filtered off, washed well with water, dried, and crystallized from a liter of ethanol. About 59.5 g. of the nitrated product, M.P.=170° C. are obtained. The yield amounts to 70% of the theoretical based on the oxazine used as starting material.

The 6-nitro compound thus obtained is a white powder, crystalline, soluble in acetone, difficulty soluble in alcohols and in benzol, insoluble in water. The compound is unstable in the presence of alkali and opening of the oxazine ring results.

Preparation of A–350 bisulfate

6 - nitro-4-oxo-2-($\beta$-chloroethyl)-2,3-dihydrobenzo-1,3-oxazine (0.1 mole), obtained as previously described, is dissolved in 1000 ml. boiling benzol. Then, over a period of about 20 minutes, there is added powdered iron, 600 g., which had been previously treated with 160 ml. concentrated hydrochloric acid and then dried. Water, 300 ml., is added; the mixture is refluxed for 30 minutes and is filtered while still hot. The benzol layer is separated and subjected to distillation to eliminate water completely. After the water-benzol azeotrope has been removed, the solution is cooled in an ice bath and the 6-amino derivative (A-350) crystallizes, M.P.=150-152° C. The yield is about 15 g. which amounts to 65% of the theoretical based on the nitro derivative used as starting material.

To prepare the bisulfate salt, A-350, 21 g., is suspended in 150 ml. of 95% ethyl alcohol with agitation and is added to a solution of 39 g. $H_2SO_4$ in 300 cc. 95% ethyl alcohol at a temperature of from 0° C. to about 5° C. The mixture is cooled to 0° C. and the bisulfate salt crystallizes. The crystals are filtered, washed with ethyl ether and dried at room temperature. About 25 g. of white crystals, M.P. 122°–124° are obtained.

The following examples illustrate the practice of this invention.

EXAMPLE 1

Preparation of Singletin

In a 1500-ml. flask, A-350 bisulfate, 20 g., is dissolved at room temperature with agitation in 1100 ml. of methanol containing 2% by weight water. To this solution is added a suspension of 24 g. of tetracycline in 100 ml. of 99% ethyl alcohol. The mixture is agitated until solution is complete. The methanol and ethyl alcohol are evaporated under a vacuum of about 20 mm. at a temperature of about 15° C. until near dryness. Ethyl ether, 500 ml., is added and the mixture is agitated for about thirty minutes. It is then filtered and dried under vacuum at room temperature. A yellow powder, 40–42 g., having a melting point ranging between 190–200° C. is obtained. It has the following composition:

Calculated, percent by weight
Tetracycline base _____ 55.2
A-350 _____ 28.15
$H_2SO_4$ _____ 12.18
$H_2O$ _____ 4.47

The structural formula is as follows:

Toxicity of Singletin

Acute toxicity.—Acute toxicity of Singletin was determined in mice, rats, rabbits, and guinea pigs by various routes of administration. The results obtained are reported in Table 1. For comparison, values for acute toxicity by oral and intraperitoneal administration of tetracycline and A-350 separately in rats and mice are also given. The results show that acute toxicity of Singletin does not differ from that of the individual components after oral administration, in all three cases being extremely low. However, by the intraperitoneal route, Singletin is more toxic than A-350 sulfate due to the tetracycline content. Tetracycline is more toxic intraperitoneally, than is Singletin. These results show that there is no synergism of toxicity.

TABLE 1.—ACUTE TOXICITY OF SINGLETIN AND ITS COMPONENTS

| Compound | Animal species | Route of administration | $LD_{50}$, mg./kg. | No. of animals |
|---|---|---|---|---|
| Singletin | Albino rat F | P.os | 2,280 (2,070–2,576) | 80 |
|  | Albino rat F | I.p | 470 (409–548) | 70 |
|  | Albino rat F | I.v | 162 (139–184) | 60 |
|  | Albino rat M | I.p | 512 (488–563) | 40 |
|  | Mouse F | P.os | 1,925 (1,812–2,096) | 75 |
|  | Mouse F | I.p | 465 (419–515) | 80 |
|  | Mouse F | I.v | 242 (208–278) | 70 |
|  | Mouse M | I.p | 452 (421–503) | 50 |
|  | Guinea pig M | P.os | >1,500 | 20 |
|  | Guinea pig M | I.p | 560 (505–612) | 35 |
|  | Rabbit F | I.p | 626 (585–658) | 30 |
| A-350 sulfate | Albino rat F | P.os | 1,958 (1,847–2,024) | 110 |
|  | Albino rat F | I.p | 607 (585–632) | 80 |
|  | Mouse F | P.os | >2,500 | 80 |
|  | Mouse F | I.p | 924 (887–956) | 76 |
| Tetracycline (base) | Albino rat F | P.os | 2,130 (1,925–2,315) | 80 |
|  | Albino rat F | I.p | 325 (275–362) | 60 |
|  | Mouse F | P.os | 2,850 (2,420–3,215) | 60 |
|  | Mouse F | I.p | 285 (251–312) | 60 |

P.os=oral; I.p.=intraperitoneal; I.v.=intravenous; F=female; M=male.

Chronic oral toxicity.—Chronic oral toxicity of Singletin was studied in rats and rabbits. In rats, Singletin was administered daily in doses of 50 and 150 m./kg. for a period of 80 days. The weight and death rate of animals were checked daily. Every 20 days, the following determinations were made: food consumption; red and white blood corpuscle count; blood sugar by the method of Hagedorn and Jensen, Biochem. Zeit. 137, 92(1923); total cholesterolemia by the method of Schonheimer and Sparry, J. Biol. Chem. 106, 745(1934); total proteinemia by the method of Kibrick, J. Lab. Clin. Med. 34, 1171(1949); liver glycogen by the method of Kemp et al., Biochem. J. 56, 646(1954); adrenal ascorbic acid by the method of Roe and Knether, J. Biol. Chem. 147, 199(1943); and glycosuria. In addition, the degree of liver function was evaluated by the bromophenolsulfonphthalein biliary excretion method of Cantarow et al., Am. J. Physiol. 154, 211(1948). The results are given in Table 2.

Singletin was tolerated by rats without symptoms throughout the test period at a dose of 50 mg./kg. The rate of body weight increase was normal. No abnormalities were detected by any of the tests performed.

At a dose of 150 mg./kg., no change in the general condition of the animals occurred until after 40 days of administration when some signs of sedation appeared, probably a result of the depressant effect of A-350 on the central nervous system (see Ferrari and Garzia, Arzneim-Forsch. 14, 55(1964)). These symptoms were not ascribed to toxicity, but rather were attributed to

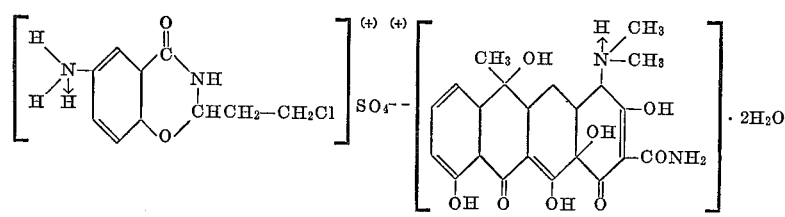

the pharmacological activity of A-350. After 60 days at a dose of 150 mg./kg., food consumption decreased and the rate of body weight increase was slowed. On the 80th day the death rate was 20%. However, functional indexes were virtually unchanged.

Antiphlogistic activity

Three methods of inducing experimental inflammation were employed to test the antiphlogistic activity of Singletin. Details of these three methods are given at the foot TABLE 2.—CHRONIC TOXICITY OF SINGLETIN IN THE FEMALE ALBINO RAT, ORAL ADMINISTRATION FOR 80 DAYS

| Days of treatment | Treatment | Weight, g. | Dead/treated | Food consumption, g./100 g. | Red corpuscles, mil/mm.$^3$ | White corpuscles, thous/mm.$^3$ | Glycemia, mg. percent |
|---|---|---|---|---|---|---|---|
| 0 | Controls | 104±5.2 | | 12.3±5.1 | 7.10±0.52 | 8.12±0.81 | 96.7±5.3 |
|   | 50 mg./kg. | 107±4.6 | | 11.8±3.9 | 6.98±0.39 | 9.05±0.72 | 89.8±6.4 |
|   | 150 mg./kg. | 108±6.3 | | 12.6±4.3 | 7.21±0.41 | 8.64±0.59 | 93.4±4.9 |
| 10 | Controls | 121±8.6 | 0/30 | | | | |
|   | 50 mg./kg. | 125±9.6 | 0/30 | | | | |
|   | 150 mg./kg. | 119±8.4 | 0/30 | | | | |
| 20 | Controls | 139±7.2 | 0/30 | 10.6±3.4 | 7.02±0.36 | 7.29±0.64 | 102.9±6.4 |
|   | 50 mg./kg. | 141±6.3 | 0/30 | 11.2±3.1 | 6.81±0.24 | 8.15±0.51 | 94.6±5.2 |
|   | 150 mg./kg. | 135±8.1 | 0/30 | 9.7±2.5 | 7.12±0.31 | 9.12±0.39 | 98.9±9.6 |
| 30 | Controls | 148±5.9 | 0/30 | | | | |
|   | 50 mg./kg. | 153±8.2 | 0/30 | | | | |
|   | 150 mg./kg. | 142±6.3 | 0/30 | | | | |
| 40 | Controls | 168±7.3 | 0/30 | 9.1±4.2 | 6.58±0.45 | 7.63±0.19 | 99.5±6.2 |
|   | 50 mg./kg. | 165±6.9 | 0/30 | 9.6±3.1 | 6.91±0.39 | 7.41±0.31 | 97.3±5.4 |
|   | 150 mg./kg. | 159±8.2 | 1/30 | 8.2±3.6 | 7.02±0.48 | 8.15±0.47 | 89.8±8.3 |
| 50 | Controls | 181±11.4 | 0/30 | | | | |
|   | 50 mg./kg. | 179±9.6 | 1/30 | | | | |
|   | 150 mg./kg. | 165±8.4 | 3/30 | | | | |
| 60 | Controls | 187±8.5 | 0/30 | 8.7±2.3 | 6.48±0.25 | 7.47±0.47 | 89.6±5.3 |
|   | 50 mg./kg. | 191±7.9 | 1/30 | 9.1±3.1 | 6.61±0.31 | 7.91±0.32 | 94.6±7.3 |
|   | 150 mg./kg. | 178±6.3 | 3/30 | 7.3±4.0 | 6.59±0.37 | 7.21±0.62 | 86.2±9.3 |
| 70 | Controls | 203±8.3 | 1/30 | | | | |
|   | 50 mg./kg. | 198±9.1 | 1/30 | | | | |
|   | 150 mg./kg. | 185±7.2 | 4/30 | | | | |
| 80 | Controls | 215±6.9 | 1/30 | 9.1±2.6 | 6.59±0.29 | 7.41±0.43 | 93.4±9.1 |
|   | 50 mg./kg. | 209±6.3 | 1/30 | 10.2±2.4 | 6.72±0.36 | 7.56±0.39 | 96.5±3.6 |
|   | 150 mg./kg. | 191±8.7 | 6/30 | 6.1±1.3 | 6.02±0.27 | 6.59±0.27 | 73.8±4.2 |

| Days of treatment | Cholesterolemia, mg. percent | Proteins, g. percent | Liver glycogen, mg. percent | Glycosuria | Biliary excretion, BSP/100 g./h. | Adrenal ascorbic acid, mg./g. |
|---|---|---|---|---|---|---|
| 0 | 72.5±9.1 | 7.6±0.6 | 171.3±21.3 | Absent | 298±36 | 4.05±0.29 |
|   | 81.4±8.3 | 8.1±0.5 | 184.5±19.2 | do | 315±41 | 3.87±0.36 |
|   | 83.9±5.8 | 7.4±0.6 | 178.6±18.7 | do | 307±39 | 3.91±0.19 |
| 10 | | | | | | |
| 20 | 85.9±8.6 | 7.9±0.5 | 174.3±23.6 | Absent | 302±29 | 3.98±0.31 |
|   | 83.6±7.6 | 7.7±0.7 | 191.5±29.2 | do | 329±34 | 3.84±0.19 |
|   | 88.9±6.3 | 8.3±0.4 | 184.6±32.3 | do | 364±43 | 3.51±0.23 |
| 30 | | | | | | |
| 40 | 91.4±7.3 | 8.2±0.9 | 196.5±31.3 | Absent | 315±36 | 4.12±0.19 |
|   | 85.6±6.4 | 7.8±0.8 | 164.6±21.8 | do | 312±48 | 3.78±0.22 |
|   | 87.1±7.3 | 7.3±0.8 | 172.5±36.4 | do | 305±31 | 3.21±0.27 |
| 50 | | | | | | |
| 60 | 82.5±8.4 | 7.9±0.5 | 185.9±29.7 | Absent | 325±21 | 3.81±0.21 |
|   | 74.6±3.9 | 7.7±0.6 | 179.2±31.4 | do | 321±34 | 3.29±0.36 |
|   | 81.9±5.8 | 6.9±0.3 | 178.6±19.5 | do | 284±56 | 2.98±0.31 |
| 70 | | | | | | |
| 80 | 87.6±6.2 | 7.9±0.6 | 169.2±19.6 | Absent | 315±39 | 3.96±0.46 |
|   | 82.4±5.8 | 7.9±0.7 | 184.6±21.4 | do | 302±24 | 3.42±0.24 |
|   | 89.9±7.3 | 6.4±0.6 | 187.3±36.2 | do | 277±32 | 3.11±0.21 |

The daily oral administration to rabbits of 100 mg./kg. of tetracycline A-350 sulfate for two months was tolerated without symptoms. The data are given in Table 3.

TABLE 3.—CHRONIC ORAL TOXICITY OF SINGLETIN
[Rabbit, F: 100 mg./kg. per day for 60 days]

| | Controls | Treated |
|---|---|---|
| Weight, at beginning, g. | 2,180±158 | 2,250±184 |
| Weight, at end, g. | 2,715±196 | 2,690±215 |
| Dead/treated | 0/6 | 0/10 |
| At end: | | |
| Red corpuscles, mil/mm.$^3$ | 4.91±0.36 | 5.07±0.46 |
| White corpuscles, mil/mm.$^3$ | 6.12±0.31 | 6.15±0.39 |
| Serum glutamic-oxalacetic transaminase, U/ml | 73±9 | 91±12 |
| Serum piruvic-oxalacetic transaminase, U/ml | 14±5 | 18±6 |
| Glycemia, mg. percent | 91±13 | 85±16 | of Table 4, but briefly they consist of injection of carrageenin, dextran, and formalin, respectively, in experimental animals to produce edema. One hour later the test compound was administered orally at several dosage levels to determine the antiphlogistic activity. Three compounds were tested: (1) Singletin at dosages of 100, 200, 300 and 400 mg./kg.; (2) tetracycline base at doses corresponding to the tetracycline content of Singletin; and (3) A-350 base at doses corresponding to the A-350 content of Singletin.

The results tabulated in Table 4 show that the antiphlogistic activity of Singletin originates in the A-350 and this activity is not altered by the tetracycline, which is ineffective in the treatment of experimental phlogosis.

TABLE 4.—ANTIPHLOGISTIC ACTIVITY OF SINGLETIN IN ALBINO RATS

| Compound | Dose, mg./kg. | Percent inhibitions of localized edema by: | | |
|---|---|---|---|---|
| | | Carrageenin [1] | Dextran [2] | Formalin [3] |
| Singletin | 100 | 13.7±2.1 (15) | | |
| | 200 | 25.1±1.9 (15) | 15.7±3.1 (18) | 9.3± (18) |
| | 300 | 36.9±2.8 (18) | 17.7±1.7 (18) | 12.5± (15) |
| | 400 | 46.2±1.7 (15) | 19.7±2.1 (18) | 18.6± (18) |
| A-350 (base) | 29.5 | 125±1.9 (15) | | |
| | 59.0 | 24.8±2.7 (18) | 12.8±2.6 (15) | 8.2±1.2 (15) |
| | 78.5 | 32.8±3.1 (12) | 18.7±2.5 (15) | 10.3±1.8 (15) |
| | 118.0 | 43.1±3.8 (12) | 22.4±3.2 (10) | 15.7±2.9 (15) |
| Tetracycline (base) | 57.8 | 2.5±0.7 (10) | | |
| | 116.6 | 3.1±0.8 (10) | 1.7±1.1 (10) | 1.5±0.6 (10) |
| | 173.4 | 3.9±0.6 (10) | 4.5±0.9 (10) | 2.1±0.8 (10) |
| | 231.2+ | 2.5±0.9 (10) | 3.2±0.7 (10) | 2.4±0.7 (10) |

[1] 1% solution in sterile saline: 0.1 ml. is injected into the subplantar zone of the right hind paw. Plethysmographic measurement after 5 hours. The compounds under examination are administered 1 hour before induction of phlogosis.

[2] 0.5% solution in sterile saline: 0.1 ml. is injected into the subplantar zone of the right hind paw. Plethysmographic measurement after 3 hours. The compounds under examination are administered 1 hour before induction of phlogosis.

[3] 2% solution in sterile saline: 0.1 ml. are injected into the subplantar zone of the right hind paw. Plethysmographic measurement after 3 hours. The compounds under examination are administered 1 hour before induction of phlogosis.

Antipyretic activity

The temperature of the test rabbits was measured at the beginning of the test and again one hour later after which fever was induced by injecting a sterilized *Escherichia coli* broth-culture intravenously. Two hours later Singletin solution was administered intraperitoneally at two dosage levels to determine antipyretic activity. Normal saline solution was injected in one control group, and A-350 and tetracycline were injected in separate groups of animals at dosages corresponding to the higher dosage of Singletin. The tabulated results given in Table 5 show that Singletin has an antipyretic effect equal to the comparable amount of A-350, and that tetracycline does not affect the antipyretic effect of A-350.

The following levels were used:

| Singletin, λ/ml., to which correspond | A-350, λ/ml. | Tetracycline λ/ml. |
|---|---|---|
| 0.5 | 0.145 | 0.280 |
| 1.0 | 0.290 | 0.570 |
| 3.0 | 0.870 | 1.790 |
| 6.0 | 1.740 | 3.420 |
| 12.0 | 3.480 | 6.840 |
| 25.0 | 7.250 | 14.250 |
| 50.0 | 14.500 | 28.500 |
| 100.0 | 29.000 | 57.000 |

Three tests were performed, in the first one, Singletin was added to the broth-culture without adjusting the resulting pH, which declines to 4.8 due to the acidity of the compound. In the second test the nutritive broth was buffered after Singletin addition so that the pH was 6.8 to 6.9. In the last assay the action of tetracycline alone was tested at corresponding levels and the broth pH was 6.8 to 7.0. The results are summarized in Tables 6, 7, and 8. They show that the antibiotic activity of tetracycline is not altered in combination with A-350.

TABLE 5.—ANTIPYRETIC ACTIVITY OF SINGLETIN IN RABBIT

| | Body temperature, ° C. | | | | |
|---|---|---|---|---|---|
| 1st hour | 38.1±0.5 | 37.9±0.6 | 38.3±0.7 | 37.6±0.3 | 38.0±0.6 |
| 2nd hour | 37.8±0.4 | 38.2±0.6 | 38.0±0.6 | 37.8±0.4 | 37.9±0.5 |
| | Intravenous injection of sterilized *E. coli* broth culture | | | | |
| 3rd hour | 38.9±0.6 | 39.2±0.5 | 39.6±0.3 | 39.5±0.6 | 39.5±0.4 |
| 4th hour | 39.8±0.6 | 39.7±0.8 | 40.1±0.6 | 40.3±0.5 | 39.9±0.7 |
| | Normal saline, 2 cc./kg., i.p. | Singletin, 150 mg./kg., i.p. | Singletin, 300 mg./kg., i.p. | A-350, 78.5 mg./kg., i.p. | Tetracycline, 173.4 mg./kg., i.p. |
| 5th hour | 39.9±0.5 | 39.7±0.6 | 39.5±0.4 | 39.6±0.5 | 39.9±0.6 |
| 6th hour | 40.7±0.6 | 39.5±0.5 | 39.2±0.7 | 39.4±0.3 | 39.7±0.5 |
| 7th hour | 40.5±0.7 | 39.2±0.4 | 39.0±0.8 | 39.2±0.5 | 40.1±0.4 |
| 8th hour | 39.8±0.4 | 39.3±0.6 | 38.9±0.3 | 38.8±0.6 | 39.8±0.7 |
| 9th hour | 39.3±0.7 | 39.2±0.7 | 38.9±0.6 | 38.6±0.5 | 39.2±0.6 |

Antibiotic activity

The antibiotic activity of Singletin was tested in vitro as compared with that of tetracycline on the following strains: *Staphylococcus aureus*, *Salmonella thiphymurium*, *Corynebacterium xerosis*, *Bac. megetherium*, *Mycobacterium species*.

TABLE 6.—ANTIBIOTIC ACTIVITY OF SINGLETIN WHEN pH OF NUTRITIVE BROTH=4.8

| Singletin, γ/ml.= | 0.5 | 1 | 3 | 6 | 12 | 25 | 50 | 100 | Control |
|---|---|---|---|---|---|---|---|---|---|
| *Staphylococcus aureus* | +++ | +++ | +++ | + | − | − | − | − | +++ |
| *Salmonella thiphy* | +++ | ++ | + | − | − | − | − | − | +++ |
| *Corynebact. xerosis* | +++ | ++ | + | − | − | − | − | − | +++ |
| *Bac. megatherium* | +++ | ++ | + | − | − | − | − | − | +++ |
| *Mycobacterium species* | +++ | ++ | + | + | + | − | − | − | +++ |

+=slight growth of organism.
++=moderate.
+++=heavy.

TABLE 7.—ANTIBIOTIC ACTIVITY OF SINGLETIN WHEN pH OF NUTRITIVE BROTH=6.8-6.9

| Singletin, γ/ml.= | 0.5 | 1 | 3 | 6 | 12 | 25 | 50 | 100 | Control |
|---|---|---|---|---|---|---|---|---|---|
| Staphylococcus aureus | +++ | +++ | +++ | + | + | − | − | − | +++ |
| Salmonella thiphy | +++ | +++ | ++ | + | ± | − | − | − | +++ |
| Corynebact. xerosis | +++ | +++ | +++ | ++ | + | − | − | − | +++ |
| Bac. megatherium | +++ | +++ | +++ | ++ | + | − | − | − | +++ |
| Mycobacterium species | +++ | +++ | +++ | +++ | ++ | + | − | − | +++ |

+=slight growth of organism.
++=moderate.
+++=heavy.

TABLE 8.—ANTIBIOTIC ACTIVITY OF TETRACYCLINE WHEN pH OF NUTRITIVE BROTH-6.8-7.0

| Tetracycline, γ/ml. | 0.285 | 0.57 | 1.71 | 3.42 | 6.84 | 14.25 | 28.50 | 57.00 | 100 | Control |
|---|---|---|---|---|---|---|---|---|---|---|
| Staphylococcus aureus | +++ | +++ | +++ | +++ | ++ | + | − | − | − | +++ |
| Salmonella thiphy | +++ | +++ | +++ | ++ | + | ± | − | − | − | +++ |
| Corynebact. xerosis | +++ | +++ | +++ | +++ | ++ | + | − | − | − | +++ |
| Bac. megatherium | +++ | +++ | +++ | +++ | ++ | + | − | − | − | +++ |
| Mycobacterium species | +++ | +++ | +++ | +++ | ++ | ++ | + | − | − | +++ |

+=slight growth of organism.
++=moderate.
+++=heavy.

Blood levels of tetracycline after administration of Singletin

To two groups of sixty female albino rats of average weight of 120 g. was given orally 50 or 100 mg./kg. of tetracycline and the corresponding doses of 86.5 and 173 mg./kg. of Singletin. After 1, 2, 3, 5, and 7 hours sterile blood samples were removed by cardiac puncture from 12 animals of each of the two groups. On the serum recovered from the blood of each of the 12 animals the tetracycline level was determined by the cup-plate assay procedure as follows: In square plates 50 cm. on a side was solidified a 5-mm. layer of Bacto Penassay Base Agar. Above this was poured a 3-mm. layer of Bacto Penassay Seed Agar to which had been added, at a temperature of 48° C., 2 cc. of a 24-hour culture of *Micrococcus aureus*, strain 209P, ATCC6538 in Bacto Penassay Broth.

After this second layer had solidified, 49 cups of 3-mm. diameter were placed on each plate. Of these, 36 were filled with the serum samples under examination, one was filled with serum from control animals, and 12 were filled with tetracycline standards prepared by dissolving 0.62, 1.25, 2.5 and 5.0 micrograms per milliliter of tetracycline hydrochloride in serum of normal rats. The plates were left 5 hours in the refrigerator at 4° C., then incubated 15 hours at 37° C.

The zones of inhibition, expressed in millimeters, were plotted on coordinate paper as the ordinate against the concentration of tetracyline expressed in γ/cc. on the abscissa. In this way a dose-effect curve was obtained. The diameters of the zones of inhibition around the cylinders containing the serum being examined permits calculation of the concentrations of tetracycline by uses of the above curve.

The results are reported in Table 9. They show that blood levels of tetracycline are of longer duration after administration of an equivalent amount of tetracycline hydrochloride. In fact, five hours after administration blood levels from tetracycline are at the lower limits of the sensitivity of the method, while those from Singletin are significantly higher. Finally, seven hours after administration of 86.5 mg./kg. of Singletin the antibiotic is clearly demonstrable, while after this time the antibiotic left from administration of tetracycline is present only in traces. The curve after administration of a double dose of Singletin and of tetracycline shows a similar trend.

TABLE 9.—BLOOD LEVELS OF TETRACYCLINE AFTER ADMINISTRATION OF SINGLETIN OR TETRACYCLINE HYDROCHLORIDE TO THE RAT

| Time after administration (hours) | Treatment (mg./kg., oral) | | | |
|---|---|---|---|---|
| | Singletin | | Tetracycline | |
| | *86.5 | *173 | *50 | *100 |
| 1 | 2.4±0.5 | 4.2±0.4 | 2.8±0.6 | 5.2±0.3 |
| 2 | 4.1±0.6 | 7.7±0.5 | 4.7±0.9 | 8.1±0.4 |
| 3 | 3.2±0.7 | 6.1±0.6 | 0.9±0.4 | 2.4±0.5 |
| 5 | 2.1±0.6 | 3.9±0.3 | 0.9±0.4 | 2.4±0.5 |
| 7 | 1.8±0.5 | 2.4±0.2 | <0.62 | 1.2±0.3 |
| 9 | 1.1±0.5 | 1.8±0.4 | <0.62 | <0.62 |

* Ml. tetracycline in serum. Each value is the average of 10 determinations.

Concentration of tetracycline in the exudate from the sack of Selye after administration of Singletin The penetration of tetracycline into localized areas of inflammation after the administration of Singletin is superior to the penetration by tetracycline alone. This effect is demonstrated as follows. The formation of the sack of Selye was caused in two groups of 50 female albino rats of average weight of 100 g., by injecting 20 cc. of air subcutaneously and intrascapularly into each rat, which was anesthetized with ether. Into the sack thus formed was injected 0.75 cc. of turpentine, which caused an inflammatory reaction with the formation of a purulent exudate. After 48 hours the air was aspirated through a thin needle and sterile syringe. To one of the groups was given intravenously 200 mg./kg. of Singletin and to the other 115.4 mg./kg. of tetracycline.

The animals used for these experiments were maintained on a diet free of antibiotic for at least 15 days prior to and during the experiment. At various times after the administration of the drugs the animals were sacrificed and the contents of the sack aspirated sterilely and placed in a sterile container. The tetracycline content was then determined as previously described.

The results are recorded in Table 10. They show that after the administration of Singletin, tetracycline is present in the inflammatory exudate for a longer period and in larger amounts than after the administration of an equivalent amount of tetracycline. This is analogous to the findings in the case of the blood levels.

TABLE 10.—CONCENTRATION OF TETRACYCLINE IN THE EXUDATE FROM THE SACK OF SELYE AFTER ACUTE TREATMENT WITH SINGLETIN OR TETRACYCLINE HYDROCHLORIDE

| | Treatment (mg./kg., IV) | |
|---|---|---|
| Time after injection (hours) | Singletin, 200/ml.[1] | Tetracycline, 1115.4/ml.[1] |
| ½ | 8.2±1.3 | 7.9±1.2 |
| 1 | 10.3±0.8 | 8.3±0.9 |
| 3 | 11.4±0.7 | 8.9±1.4 |
| 6 | 10.2±1.3 | 12.5±2.1 |
| 12 | 12.5±1.1 | 9.4±1.5 |
| 24 | 9.6±0.8 | 5.3±0.7 |
| 48 | 5.9±0.5 | 1.4±0.3 |
| 72 | 3.2±0.3 | <0.62 |

[1] Tetracycline in exudate. Each value is the average of 6 determinations.
IV=intravenous.

Clinical effectiveness

Use in man.—Singletin has been administered to 138 patients, 96 of whom had acute or chronic infections of the respiratory system (5 pneumonia, 26 bronchial-pneumonia, 10 acute bronchitis, 24 chronic bronchitis, 3 exudative pleuritis, 9 bronchiectasis, 2 pulmonary abscess, 8 asthmatic bronchitis, 6 viral pneumonia, 3 pulmonary embolism); 26 were surgical patients who had post-operative septic-phlogistic complications and 4 had thrombophlebitis of the limbs; 8 were prone to otitis or purulent sinusitis; 11 had pyogenic dermatosis; 3 patients were orthopedic patients, 1 with osteomyelitis of the tarsal bones and 2 with purulent arthritis. All of the patients were treated with Singletin in average dosages of 4 capsules, 476 mcg. per capsule, per day (in a few cases the dose was 2 capsules every 4 hours) for periods of from 7 to 31 days. No other therapy was administered except cardiotonic and araleptic drugs, vitamins, and other medications which had no therapeutic effect on the fundamental illness.

Results.—(1) The therapy was broadly effective. All of the acute cases recovered and the chronic bronchial penumonia cases showed improvement due to remission of the symptoms. In 3 cases it was necessary to change the antibiotic. Excellent results also were obtained in all of the surgical, orthopedical, otorhinolaryngological and dermatological patients. (2) In the clinical patients, the average duration of the fever and the time it took to attain clinical recovery were examined separately. The group of patients treated with Singletin as compared with an analogous group of patients treated with other tetracyclines, recovered from fever in a significantly shorter period of time. As compared with other tetracyclines, it has been shown that Singletin causes a more rapid regression of the phlogistic-exudative manifestations and of the febrile temperature, leading to a significantly more rapid recovery without affecting the natural resistance.

Side effects.—Singletin is well tolerated and is not toxic. Six patients complained of temporary gastro-enteric disturbances with nausea or diarrhea, but no other side effects were observed and no influence on the cardio-circulatory, respiratory, hepatic or renal functionality nor on the hemopoietic system was observed. Therefore no contra-indications exist for its use.

EXAMPLE 2

A mixture of about 0.5 mole of tetracycline sulfate and about 1 mole of A-350 sulfate is prepared and then administered in accordance with Example 1. The expected results are obtained.

EXAMPLE 3

A mixture of about 1.5 moles of tetracycline sulfate and about 1 mole of A-350 sulfate is prepared and then administered in accordance with Example 1. The expected results are obtained.

EXAMPLE 4

A-350 hydrochloride is prepared in the conventional manner by reacting A-350 with hydrochloric acid. A mixture of about 0.5 mole of tetracycline hydrochloride and about 1 mole of A-350 hydrochloride is prepared and then administered in accordance with Example 1. The expected results are obtained.

EXAMPLE 5

A mixture of about 1.5 mole of tetracycline hydrochloride and about 1 mole of A-350 hydrochloride is prepared and then administered in accordance with Example 1. The expected results are obtained.

Having described this invention, what is claimed is:
1. A compound of the formula:

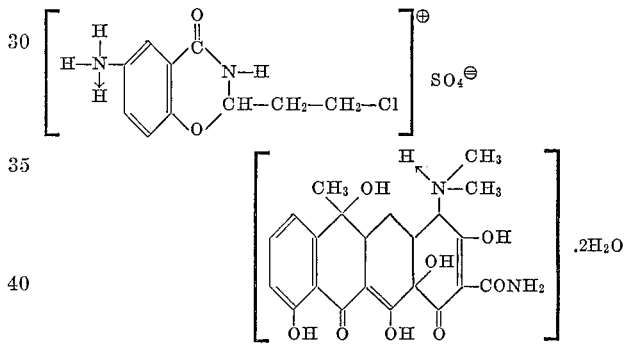

References Cited

UNITED STATES PATENTS
2,699,054  1/1955  Conover.

FOREIGN PATENTS
1,052,381  12/1966  Great Britain.

OTHER REFERENCES
Arrigoni-Martelli et al.: "Minerva Medica," vol 54, pp. 3432–3441 (1963).

HENRY R. JILES, Primary Examiner

R. T. BOND, Assistant Examiner

U.S. Cl. X.R.
260—559; 424—248

PO-1050
(5/69)

UNITED STATES PATENT OFFICE
CERTIFICATE OF CORRECTION

Patent No. 3,539,563            Dated November 10, 1970

Inventor(s) Aldo Garzia

It is certified that error appears in the above-identified patent and that said Letters Patent are hereby corrected as shown below:

Column 8, line 26, last column of table, "0.280"
    should be --0.285--.
Column 11, line 6, last column of table, "1115.4"
    should be --115.4--;
        line 34, "araleptic" should be --analeptic--.

SIGNED AND SEALED
FEB 9 1971

FEB. 9, 1971

(SEAL)
Attest:

Edward M. Fletcher, Jr.
Attesting Officer

WILLIAM E. SCHUYLER,
Commissioner of Paten